United States Patent
Kasajima et al.

(10) Patent No.: US 6,771,466 B2
(45) Date of Patent: Aug. 3, 2004

(54) VIBRATION-CANCELING MECHANISM AND HEAD GIMBAL ASSEMBLY WITH THE VIBRATION-CANCELING MECHANISM

(75) Inventors: Tamon Kasajima, Kwai Chung (HK); Masashi Shiraishi, Kwai Chung (HK)

(73) Assignee: SAE Magnetics (H.K.) Ltd., Kwai-Chung (HK)

( * ) Notice: Subject to any disclaimer, the term of this patent is extended or adjusted under 35 U.S.C. 154(b) by 205 days.

(21) Appl. No.: 10/179,385

(22) Filed: Jun. 26, 2002

(65) Prior Publication Data

US 2003/0007290 A1 Jan. 9, 2003

(30) Foreign Application Priority Data

Jul. 4, 2001 (JP) .......................................... 2001-203278

(51) Int. Cl.$^7$ .............................. G11B 5/60; G11B 5/48
(52) U.S. Cl. ................................... 360/234.6; 360/245.2
(58) Field of Search ......................... 360/234.6, 245.4, 360/245.2, 245, 245.3

(56) References Cited

U.S. PATENT DOCUMENTS

| 6,381,104 B1 | * | 4/2002 | Soeno et al. | ............. 360/234.6 |
|---|---|---|---|---|
| 6,621,661 B1 | * | 9/2003 | Ichikawa et al. | ........ 360/234.5 |
| 2003/0007288 A1 | * | 1/2003 | Kasajima et al. | ........ 360/234.6 |
| 2003/0007291 A1 | * | 1/2003 | Kasajima et al. | ........ 360/245.4 |
| 2003/0011118 A1 | * | 1/2003 | Kasajima et al. | ........... 267/141 |
| 2003/0210499 A1 | * | 11/2003 | Arya | ....................... 360/234.6 |

* cited by examiner

*Primary Examiner*—Craig A. Renner
(74) *Attorney, Agent, or Firm*—Burns, Doane, Swecker & Mathis, L.L.P.

(57) ABSTRACT

A vibration-canceling mechanism includes a vibration transfer member of a plane shape inserted between a vibration-origination system having at least one resonance frequency and an object to which a vibration is applied from the vibration-origination system. The vibration transfer member has a resonance frequency equal to or near the at least one resonance frequency of the vibration-origination system. One end section of the vibration transfer member is fixed to the vibration-origination system and the other end section of the vibration transfer member is fixed to the object so that an apparent vibration of the object is substantially canceled by a resonance of the vibration transfer member.

25 Claims, 8 Drawing Sheets

VIBRATION-CANCELING MECHANISM AND HEAD GIMBAL ASSEMBLY WITH THE VIBRATION-CANCELING MECHANISM

FIELD OF THE INVENTION

The present invention relates to a vibration-canceling mechanism for an object subjected to a mechanical vibration, and to a head gimbal assembly (HGA) with the vibration-canceling mechanism.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

In operation, the HGA and therefore the magnetic head slider are driven or swung along a radial direction of the magnetic disk (track-width direction) by an actuator called as a voice coil motor (VCM), and thus a position of the magnetic head element with respect to a track in the magnetic disk is controlled.

The actuator, a drive arm coupled to the actuator and a suspension have inherent resonance characteristics with resonance frequencies different from each other, respectively. Thus, to the magnetic head slider attached at the top end section of the suspension, a mechanical vibration modified by a composite characteristic of these inherent resonance characteristics will be transferred.

In order to suppress such mechanical vibration modified by the composite resonance characteristic, conventionally, a resonance peak of an electrical drive signal was suppressed by at least one multi-stage filter mounted in a servo circuit of the actuator.

However, because such electrical vibration-suppressing method needed to provide the multi-stage filter, the servo circuit was complicated in configuration and thus the manufacturing cost increased. Also, since the mechanical vibration was suppressed by the electrical means not directly by a mechanical means, an efficiency for suppression was extremely low.

SUMMARY OF THE INVENTION

It is therefore an aim of the present invention to provide a vibration-canceling mechanism and an HGA with the vibration canceling, whereby a mechanical vibration applied to an object can be suppressed with efficiency without greatly changing a conventional structure of the HGA.

Another aim of the present invention is to provide a vibration-canceling mechanism and an HGA with the vibration canceling, whereby a configuration of a servo circuit of an actuator can be simplified.

According to the present invention, a vibration-canceling mechanism includes a vibration transfer member of a plane shape inserted between a vibration-origination system having at least one resonance frequency and an object to which a vibration is applied from the vibration-origination system. The vibration transfer member has a resonance frequency equal to or near the at least one resonance frequency of the vibration-origination system. One end section of the vibration transfer member is fixed to the vibration-origination system and the other end section of the vibration transfer member is fixed to the object so that an apparent vibration of the object is substantially canceled by a resonance of the vibration transfer member.

When the vibration-origination system resonates, the vibration transfer member also resonates. The one end section of the vibration transfer member vibrates in phase with the vibration-origination system but the other end section of the vibration transfer member vibrates in substantially inverted phase or deviated phase as the vibration-origination system. Therefore, the vibration transfer m operates so as to move a position of the object back to its original position that will be positioned when no resonance occurs, resulting the apparent vibration of the object to cancel.

As aforementioned, according to the present invention, only by additionally attaching the vibration transfer member with a simple structure, the mechanical vibration can be extremely effectively canceled without greatly changing a conventional structure of the HGA. Also, since a configuration of a servo circuit of the actuator can be simplified, a manufacturing cost of the magnetic disk drive apparatus can be reduced.

Particularly, according to the present invention, since the vibration transfer member is configured in a plane shape, no bending process is needed and its characteristics can be adjusted only by executing a photo-etching process. Thus, a fabrication of the vibration transfer member can become very easy and also extremely high precision can be expected. The latter will present the minimum variation in the characteristics caused by a dimensional error.

It is preferred that the vibration-canceling mechanism further includes a first damper layer provided between the other end section of the vibration transfer member and the vibration-origination system, for attenuating the vibration of the object. To the both surfaces of the first damper layer, vibrations of substantially inverted phase or deviated phase with each other are applied from the vibration-origination system and the vibration transfer member, respectively. Thus the first damper layer operates to restrict an excessive inverse-movement of the vibration transfer member so as to attenuate the amplitude of the vibration, and therefore the vibration of the object fixed to the other end section of the vibration transfer member is attenuated.

It is also preferred that the vibration-canceling mechanism further includes a second damper layer provided between the one end section of the vibration transfer member and the object, for attenuating the vibration of the object.

Preferably, the first and/or second damper layer is formed by a flexible resin adhesive adhered to the vibration transfer member and to the vibration-origination system.

Also it is preferred that the vibration-cancel ng mechanism is configured to apply a load in an up-and-down direction to the first and/or second damper layer. By applying the load, the damping effect of the damping layer will increase. The resonance frequency of a system consisting of the vibration transfer member and the damper layer varies depending upon a level of the applied load.

It is preferred that the vibration-origination system is a support member including a suspension, and that the object is a head slider with at least one head element attached to a top end section of the suspension.

It is further preferred that the head slider is fixed to one surface of the vibration transfer member and the suspension is fixed to the other surface of the vibration transfer member. Since the first damper layer is provided between the other end section of the vibration transfer member and the suspension, a gap space for inserting an adhesive can be automatically obtained between the vibration transfer member and the suspension. This results extremely easy assembling of the vibration transfer member with the suspension. Also, if the second damper layer is provided between the one end section of the vibration transfer member and the head slider, a gap space for inserting an adhesive can be automatically obtained between the vibration transfer member and the head slider. This results extremely easy assembling of the vibration transfer member with the head slider.

It is preferred that the head slider has a surface opposite to its air bearing surface (ABS), and that the vibration transfer member consists of a plane metal plate substantially in parallel with the surface opposite to the ABS.

It is also preferred that vibration transfer member includes a pair of arm sections, a first coupling section connected between the pair of arm sections at the other end section, and a second coupling section connected between the pair of arm sections at the one end section. In this case, preferably, each of the arm sections, the first coupling section and the second coupling section has a plane strip shape.

It is further preferred that the at least one head element is at least one thin-film magnetic head element.

According to the present invention, furthermore, an HGA includes a head slider provided with at least one head element, a support member including a suspension and having at least one resonance frequency, and a vibration transfer member of a plane shape inserted between the suspension and the head slider to which a vibration is applied from the support member. The vibration transfer member has a resonance frequency equal to or near the at least one resonance frequency of the support member. A rear end section of the vibration transfer member is fixed to the suspension and a top end section of the vibration transfer member is fixed to the head slider so that an apparent vibration of the head slider is substantially canceled by a resonance of the vibration transfer member.

When the suspension (load beam) resonates to vibrate the flexure, the vibration transfer member also resonates. The rear end section of the vibration transfer member vibrates in phase with the flexure but the top end section of the vibration transfer member vibrates in substantially inverted phase or deviated phase as the flexure. Therefore, the vibration transfer member operates so as to move a position of the head slider back to its original position that will be positioned when no resonance occurs, resulting the apparent vibration of the head slider to cancel.

As aforementioned, according to the present invention, only by additionally attaching the vibration transfer member with a simple structure, the mechanical vibration can be extremely effectively canceled without greatly changing a conventional structure of the HGA. Also, since a configuration of a servo circuit of the actuator can be simplified, a manufacturing cost of the magnetic disk drive apparatus can be reduced.

Particularly, according to the present invention, since the vibration transfer member is configured in a plane shape, no bending process is needed and its characteristics can be adjusted only by executing a photo-etching process. Thus, a fabrication of the vibration transfer member can became very easy and also extremely high precision can be expected. The latter will present the minimum variation in the characteristics caused by a dimensional error.

It is preferred that the HGA further includes a first damper layer provided between the top end section of the vibration transfer member and the suspension, for attenuating the vibration of the head slider. To the both surfaces of the first damper layer, vibrations of substantially inverted phase or deviated phase with each other are applied from the flexure and the vibration transfer member, respectively. Thus the first damper layer operates to restrict an excessive inverse-movement of the vibration transfer member so as to attenuate the amplitude of the vibration, and therefore the vibration of the head slider fixed to the top end section of the vibration transfer member is attenuated.

It is preferred that the HGA, further includes a second damper layer provided between the rear end section of the vibration transfer m and the head slider, for attenuating the vibration of the head slider.

It is also preferred that the first and/or second damper layer is formed by a flexible resin adhesive adhered to the vibration transfer member and to the suspension.

It is further preferred that the HGA is configured to apply a load in an up-and-down direction to the first and/or second damper layer. In the actual HGA, a load from the suspension is applied to the vibration transfer member and a resistance force from the recoding disk is applied to the head slider. Thus, forces in up-and-down directions are applied to the damper layer, and therefore the damping effect of the damping layer increases. The resonance frequency of a system consisting of the vibration transfer member and the damper layer varies depending upon a level of the applied load.

It is preferred that the head slider is fixed to one surface of the vibration transfer member and the suspension is fixed to the other surface of the vibration transfer member. Since the first damper layer is provided between the top end section of the vibration transfer member and the suspension, a gap space for inserting an adhesive can be automatically obtained between the vibration transfer member and the suspension. This results extremely easy assembling of the vibration transfer member with the suspension. Also, if the second damper layer is provided between the rear end section of the vibration transfer member and the head slider, a gap space for inserting an adhesive can be automatically obtained between the vibration transfer member and the head slider. This results extremely easy assembling of the vibration transfer member with the head slider.

It is preferred that the head slider has a surface opposite to its ABS, and that the vibration transfer member consists of a plane metal plate substantially in parallel with the surface opposite to the ABS.

It is also preferred that vibration transfer member includes a pair of arm sections, a top end coupling section connected between the pair of arm sections at the top end section, and a rear end coupling section connected between the pair of arm sections at the rear end section. In this case, preferably, each of the arm sections, the top end coupling section and the rear end coupling section has a plane strip shape.

It is still further preferred that the at least one head element is at least one thin-film magnetic head element.

Further objects and advantages of the present invention will be apparent from the following description of the preferred embodiments of the invention as illustrated in the accompanying drawings.

DESCRIPTION OF THE PREFERRED EMBODIMENTS

Figure 1:
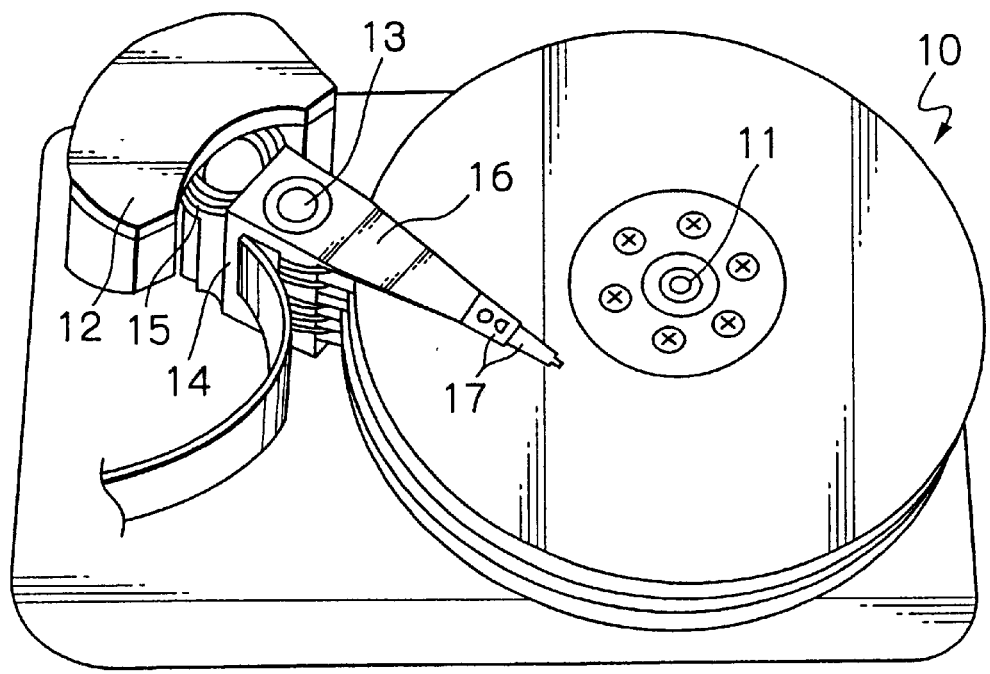
FIG. 1 is an oblique view schematically illustrating main components of a magnetic disk drive apparatus in a preferred embodiment according to the present invention.
Figure 2:
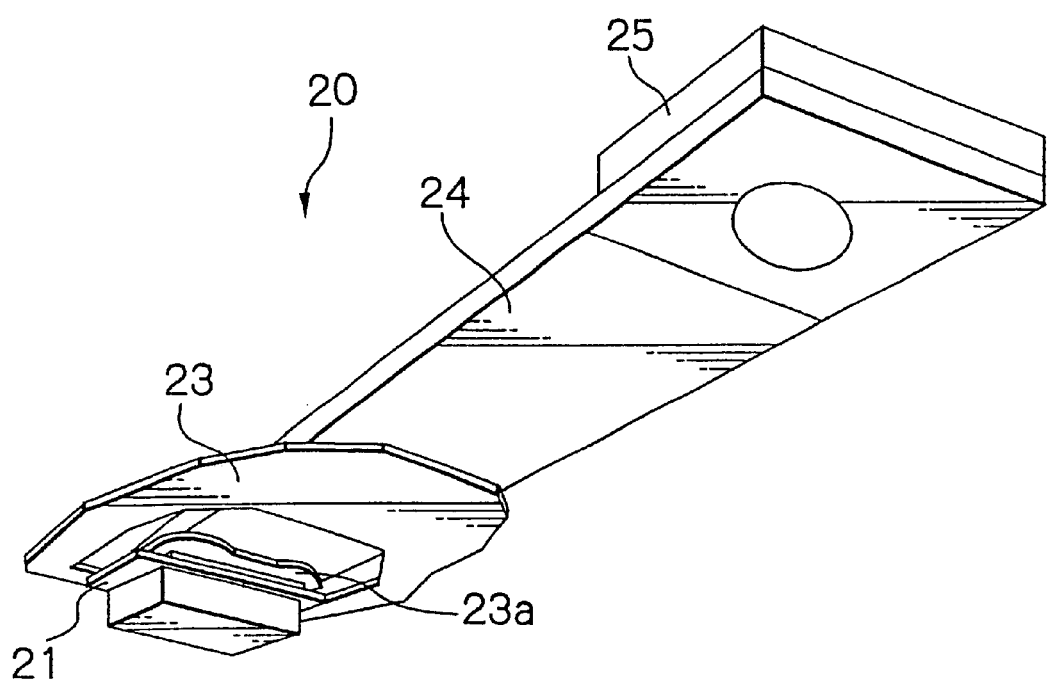
FIG. 2 is an oblique view illustrating the whole structure of an HGA in the embodiment of FIG. 1.
Figure 3:
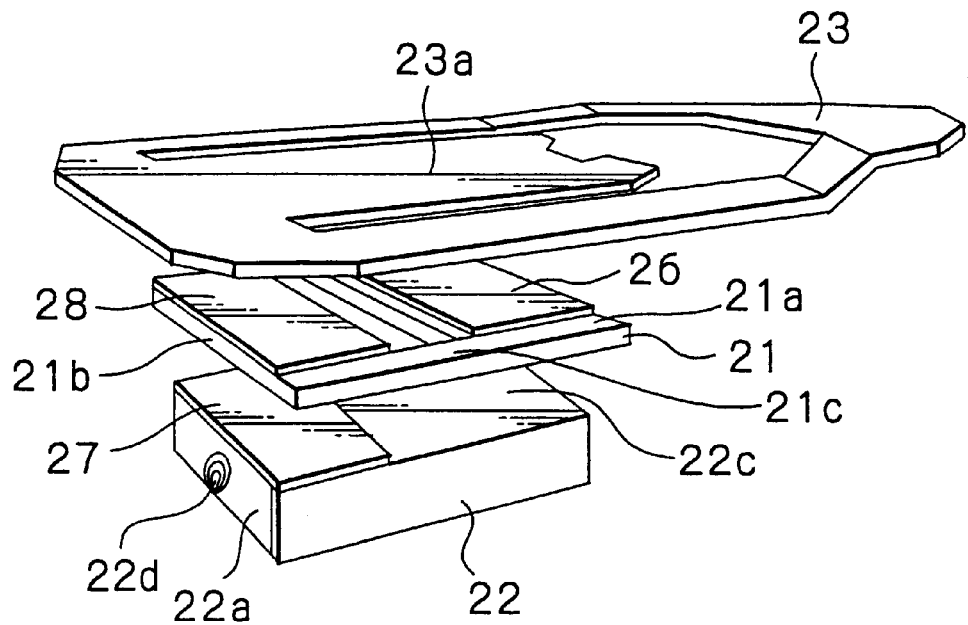
FIG. 3 is an exploded oblique view illustrating an enlarged top end section of the HGA, namely a flexure, a vibration transfer member and a magnetic head slider, in the embodiment of FIG. 1.
Figure 4:
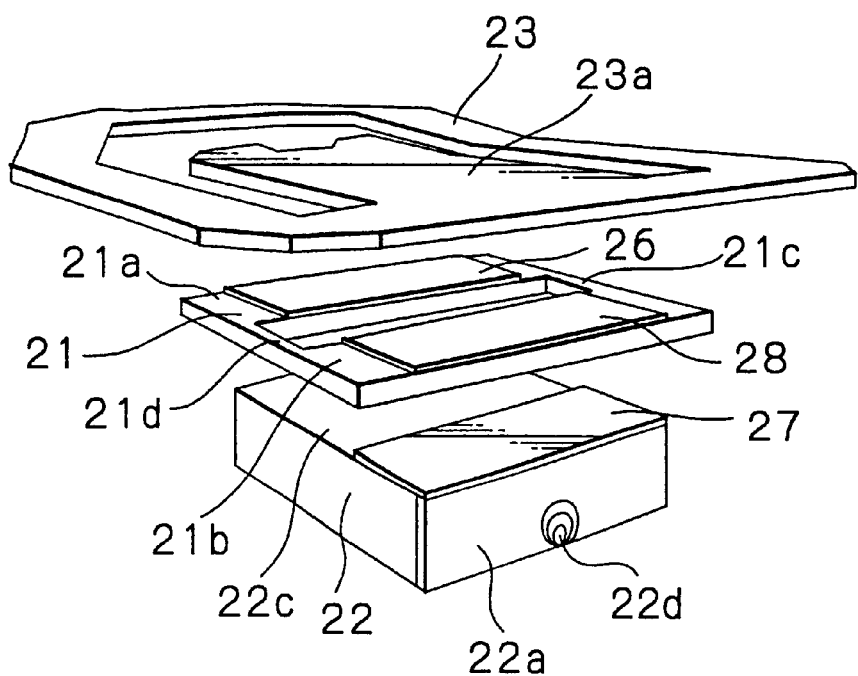
FIG. 4 is an exploded oblique view illustrating the enlarged top end section of the HGA in the embodiment of FIG. 1, seen from a different direction from FIG. 3.
Figure 5:
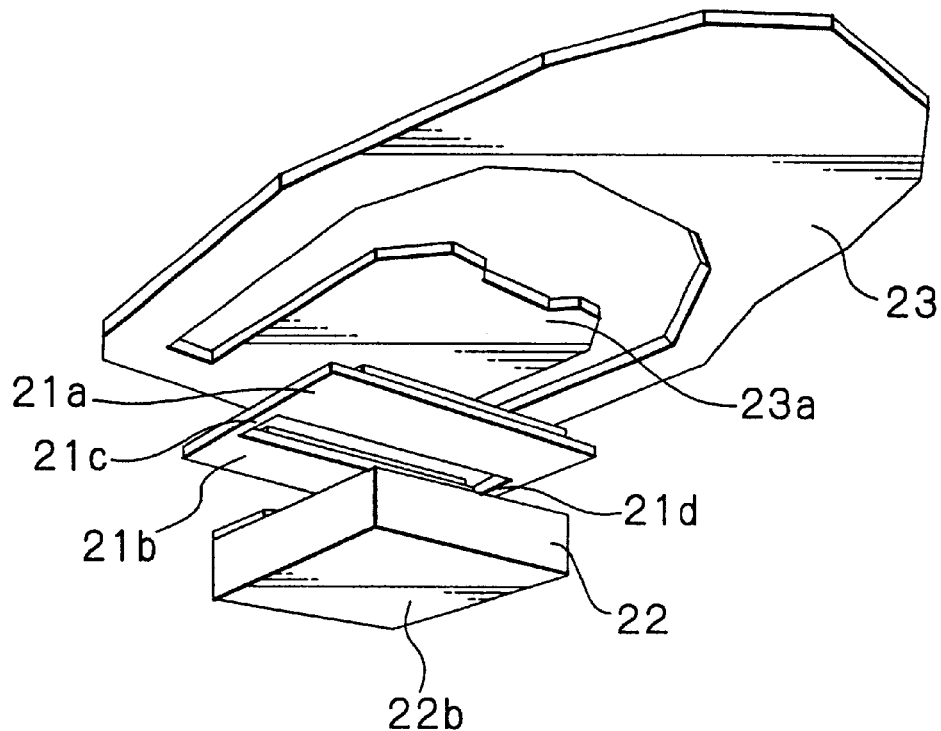
FIG. 5 is an exploded oblique view illustrating the enlarged top end section of the HGA in the embodiment of FIG. 1, seen from a different direction from FIG. 3.
Figure 6:
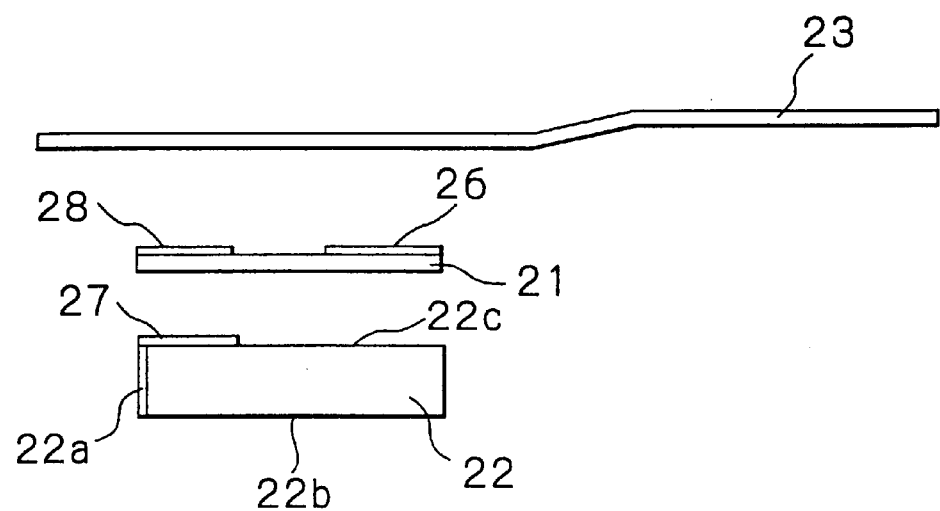
FIG. 6 is an exploded side view illustrating the enlarged top end section of the HGA in the embodiment of FIG. 1.
Figure 7:
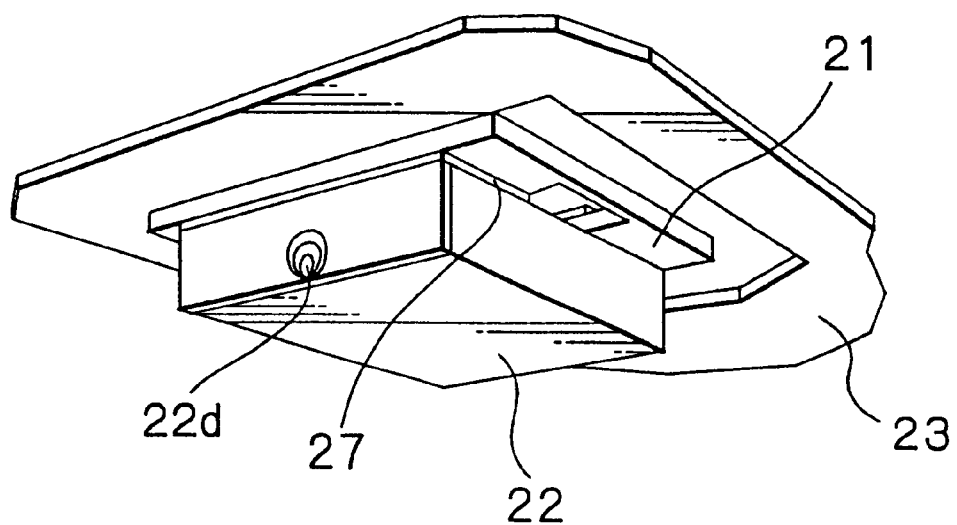
FIG. 7 is an oblique view illustrating the enlarged top end section of the HGA in the embodiment of FIG. 1.
Figure 8:
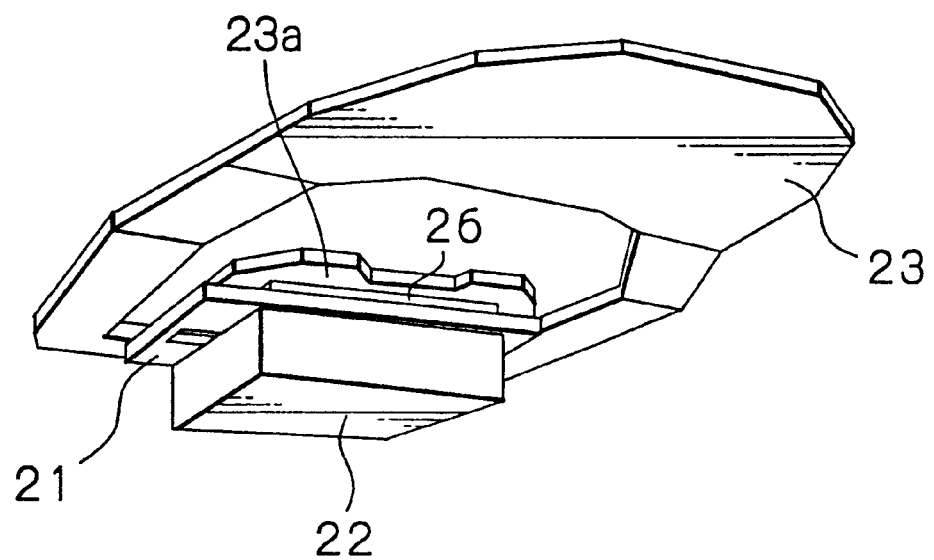
FIG. 8 is an oblique view illustrating the enlarged top end section of the HGA in the embodiment of FIG. 1, seen from a different direction from FIG. 7.
Figure 9:
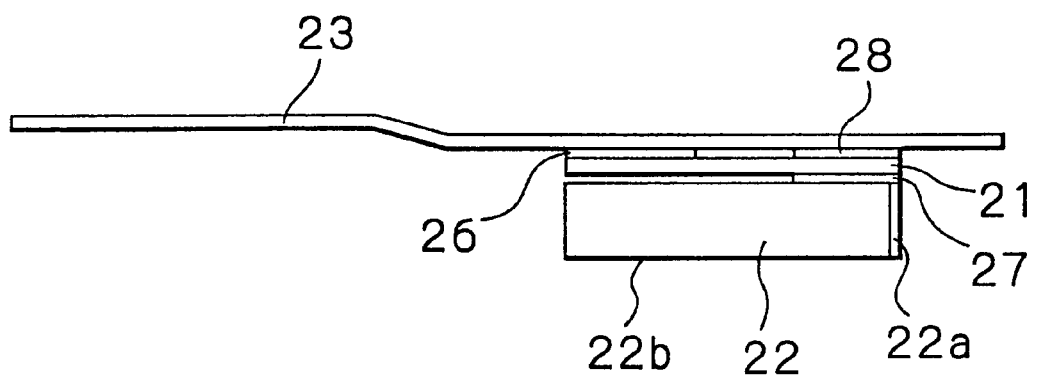
FIG. 9 is a side view illustrating the enlarged top end section of the HGA in the embodiment of FIG. 1.

FIG. 1 illustrates main components of a magnetic disk drive apparatus in a preferred embodiment according to the present invention, FIG. 2 illustrates the whole structure of an HGA in this embodiment, FIG. 3 illustrates an enlarged top end section of the HGA in this embodiment, FIGS. 4 and 5 illustrate the enlarged top end section of the HGA in this embodiment, seen from a different direction from FIG. 3, FIGS. 6 and 7 illustrate the enlarged top end section of the HGA in this embodiment, FIG. 8 illustrates the enlarged top end section of the HGA in this embodiment, seen from a different direction from FIG. 7, and FIG. 9 illustrates the enlarged top end section of the HGA in this embodiment.

In FIG. 1, reference numeral 10 denotes a plurality of magnetic hard disks rotating around an axis 11, and 12 denotes an assembly carriage device for positioning each magnetic head element on a track of each disk. The assembly carriage device 12 is mainly constituted by a carriage 14 capable of rotating around an axis 13 and an actuator 15 such as for example a VCM for driving the carriage 14 to rotate.

Base sections at one ends of a plurality of drive arms 16 stacked along the axis 13 are attached to the carriage 14, and one or two HGAs 17 are mounted on a top section at the other end of each arm 16. Each of the HGAs 17 has a magnetic head slider mounted at its top end section so that the slider opposes to one surface (recording and reproducing surface) of each of the magnetic disks 10.

As shown in FIG. 2, the HGA is assembled by fixing a vibration transfer member 21 to which a magnetic head slider 22 with a thin-film magnetic head element 22d (FIGS. 3 and 4) is fixed, to a top end section of a suspension 20. Namely, the magnetic head slider 22 is indirectly coupled with the suspension 20 through the vibration transfer member 21.

As shown in FIGS. 3–9, the magnetic head slider 22 has a rear end surface 22a on which the thin-film magnetic head element 22d is formed, an ABS 22b and a surface 22c opposite to the ABS 22b. This opposite surface 22c is tightly fixed to the vibration transfer member 21.

The suspension 20 is substantially formed by a resilient flexure 23, a load beam 24 supporting a rear end section of this flexure 23, and a base plate 25 fixed to the load beam 24.

The flexure 23 has at its top end section a flexible tongue 23a (FIGS. 3–9) provided with a proper stiffness and depressed by a dimple (not shown) formed on the load beam 24. Onto the tongue 23a, fixed is a rear coupling section 21a (FIG. 3) of the vibration transfer member 21.

The flexure 23 has elasticity for supporting flexibly the magnetic head slider 22 through the vibration transfer member 21 by this tongue 23a. This flexure 23 is made of in this embodiment a stainless steel plate (for example SUS304TA) with a thickness of about 20 $\mu$m.

The load beam 24 is made of in this embodiment a stainless steel plate with a thickness of about 60 $\mu$m, and fixed to the flexure 23 at its rear end section. The fixing of the load beam 24 with the flexure 23 is performed also by pinpoint welding at a plurality of points.

The base plate 25 to be attached to the drive arm 16 shown in FIG. 1 is made of in this embodiment a stainless steel or iron plate with a thickness of about 150 $\mu$m. This base plate 25 is fixed to a base section of the load beam 24 by welding.

On the flexure 23 and the load beam 24, flexible conductor members each including a plurality of trace conductors of a thin-film multi-layered pattern are formed or disposed. However, as the present invention does not directly concern these components, they are omitted in the drawings.

It is apparent that a structure of the suspension of the HGA according to the present invention is not limited to the aforementioned one. Although it is not shown, a head drive IC chip may be mounted on a middle of the suspension 20.

As shown in FIGS. 3–9, cutting out and/or patterning a single plane metal plate member form the vibration transfer member 21 in this embodiment. Namely, by executing patterning such as a photo-etching for example of the metal plate member, a plane rectangular contour vibration transfer member 21 with a strip-shaped rear end coupling section 21a, a strip-shaped top end coupling section 21b and a pair of arm sections 21c and 21d coupled with the both ends of the coupling sections 21a and 21b is formed. The arm sections 21c and 21d run in parallel with each other and freely movable without contact to the magnetic head slider 22 and also to the flexure 23.

The metal plate for the vibration transfer member 21 in this embodiment is made of a stainless steel and has a thickness of about 10–100 $\mu$m. As for the metal plate, any metal material plate such as a zirconia plate, a beryllium copper plate, an aluminum plate, a titanium plate, another metal plate or an alloy plate may be used other than the stainless steel plate.

An upper surface of the rear end coupling section 21a of the vibration transfer member 21 is tightly fixed to a lower surface of the tongue 23a of the flexure 23 by an adhesive 26, and a lower surface of the top end coupling section 21b is also tightly fixed to the opposite surface 22c of the magnetic head slider 22 by an adhesive 27. Thus, the magnetic head slider 22 is coupled to the flexure 23 through the vibration transfer member 21. As for the adhesive 26 and 27, a cured type adhesive such as for example an epoxy base or UV-cured adhesive may be used.

An upper surface of the top end coupling section 21b of the vibration transfer member 21 is fixed to a top end section of the flexure 23, namely a base section of the tongue 23a, by a soft or flexible adhesive that functions as a damping layer 28. As for the flexible adhesive 28, a resin adhesive such as a urethane-rubber base or acryl base pressure-sensitive adhesive for example may be used. Thus formed damping layer 28 can effectively attenuate amplitude of lateral vibrations of the magnetic head slider 22 due to a resonance in a lateral direction of the suspension (in a direction perpendicular to an axis in the plane).

Figure 10:
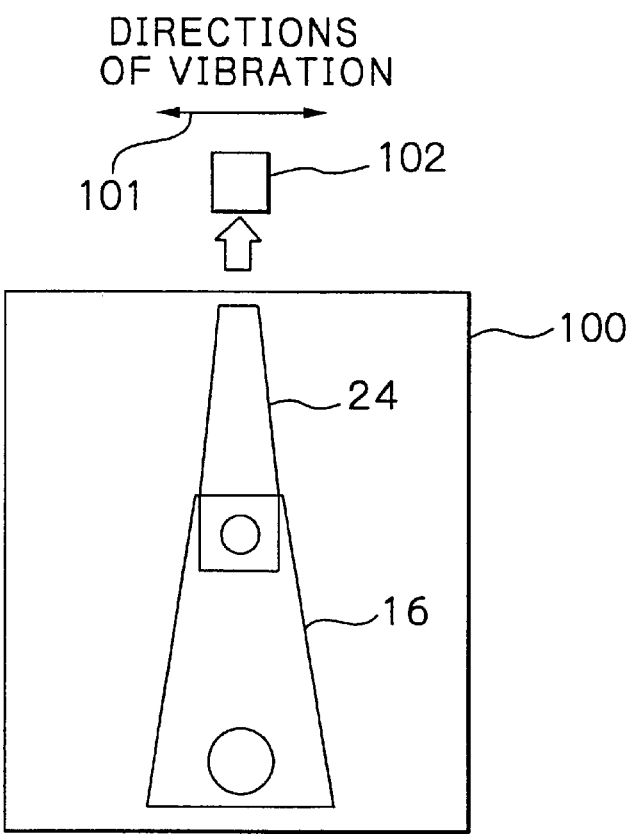
FIG. 10 is a plane view used for illustrating why a mechanical vibration is cancelled in the embodiment of FIG. 1.
Figure 11:
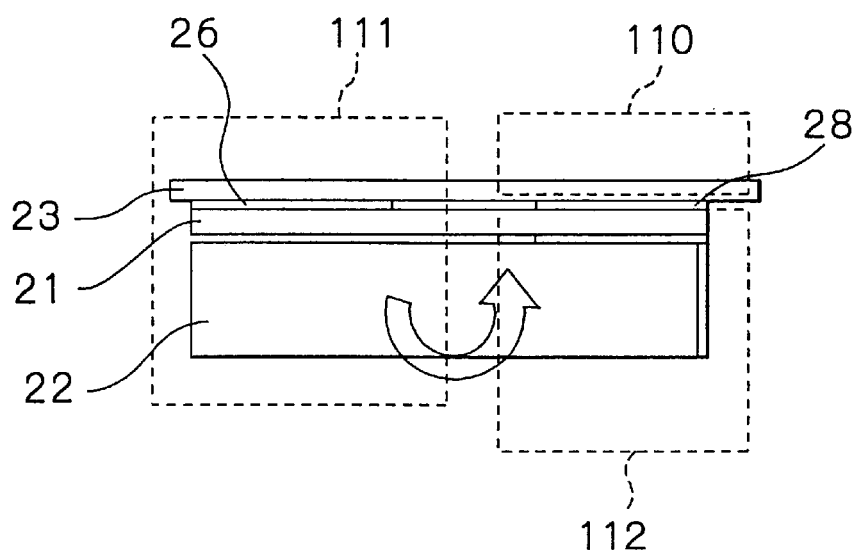
FIG. 11 is a side view used for illustrating why a mechanical vibration is cancelled in the embodiment of FIG. 1.

FIGS. 10 and 11 illustrate why a mechanical vibration is cancelled in this embodiment. In particular, FIG. 11 illustrates in detail a system 102 shown in FIG. 10.

As shown in FIG. 10, when the actuator and the drive arm 16 connected to the actuator mechanically vibrate at a frequency, the load beam 24 resonates at a resonance frequency and a vibration 101 in track-width directions appeared at the top end of the load beam 24 is applied to the system 102 connected with this vibration-origination system 100. In the system 102 shown in FIG. 11, this lateral vibration 101 is first applied to the flexure 23. However, because a resonance frequency of the flexure 23 is sufficiently higher than the frequency of the vibration, the flexure 23 will not resonate. Therefore, the flexure 23 in regions 110 and 111 will vibrate with the same phase. Here, the top end section of the vibration transfer member 21 positions in the region 110 and the rear end section of the vibration transfer member 21 positions in the region 111.

This vibration transfer member 21 fixed to the flexure 23 in the region 111 will receive the vibration from the flexure 23 and vibrate with the same phase as the flexure 23. A resonance frequency of the vibration transfer member 21 itself is set to just or near the frequency. Thus, when the vibration at the frequency is applied from the flexure 23, this vibration transfer member 21 will resonate. Because of the resonance, a vibration at the top end section of the vibration transfer member 21 in a region 112 will have an inverted phase as that of the flexure 23 in the region 110. Therefore, the vibration transfer member 21 will operate so as to move a position of the magnetic head slider 22 fixed to the vibration transfer member 21 in the region 112 back to its original position that will be positioned when no resonance occurs resulting the apparent vibration of the magnetic head slider 22 to cancel.

In this embodiment, also, the damping layer 28 operates to attenuate the vibration amplitude of the magnetic head slider 22. Namely, since the flexure 23 in the region 110 and the vibration transfer member 21 in the region 112 which sandwich the damping layer 28 move in reverse directions and provide resistances with each other, the vibration amplitude of the vibration transfer member 21 or the magnetic head slider 22 will be attenuated. This attenuation of the amplitude will be established in a frequency range near the resonance frequency, in which phases of both the vibrations are inverted to or deviate from each other.

It is desired to apply a load or loads in up-and-down directions to the damping layer 28. In fact, in the actual HGA, a load from the flexure 23 is applied to the vibration transfer member 21 and a resistance force from the recoding disk is applied to the magnetic head slider 22. Thus, forces in up-and-down directions are applied to the damper layer 28. By applying the forces, the damping effect of this damping layer 28 will increase.

As in this embodiment, even if the vibration transfer member 21 is formed by a stainless steel, a relatively low resonance frequency of the vibration transfer member 21, which is substantially equal to a swaying mode frequency of the HGA, can be attained by arranging this vibration transfer member 21 in a top-and-rear direction that is perpendicular to the direction of the applied vibration and by appropriately adjusting a length and a thickness of the vibration transfer member 21.

As aforementioned, according to this embodiment, only by additionally attaching the vibration transfer member 21 with a simple structure, for providing a vibration-transferring loop between the tongue 23a of the flexure 23 and the magnetic head slider 22, the mechanical vibration can be extremely effectively canceled without greatly changing a conventional structure of the HGA. Also, since a configuration of a servo circuit of an actuator can be simplified, a manufacturing cost of the magnetic disk drive apparatus can be reduced.

The damping layer 28 in this embodiment is provided to restrict an excessive inverse-movement of the vibration transfer member 21 so as to attenuate the amplitude of the vibration. Thus, providing of this damping layer is not a necessary condition of the present invention. However, if the damping layer is provided, not only the vibration amplitude of the magnetic head slider 22 can be effectively attenuated, but also a gap space for inserting an adhesive can be automatically obtained between the rear end coupling section 21a of the vibration transfer member 21 and the flexure 23 resulting extremely easy assembling of the vibration transfer member 21 with the flexure 23.

Particularly, according to the present invention, since the vibration transfer member 21 is configured in a plane shape, no bending process is needed and its characteristics can be adjusted only by executing a photo-etching process. Thus, a fabrication of the vibration transfer member can become very easy and also extremely high precision can be expected. The latter will present the minimum variation in the characteristics caused by a dimensional error. Furthermore, since the top and rear end sections of the vibration transfer member 21 are fixed by the adhesive, shock resistances in both this longitudinal direction and in the lateral direction increase. As a result, it is possible to shape the vibration member 21 in a thin and narrow slit shape as a longitudinally arranged plate spring.

Figure 12:
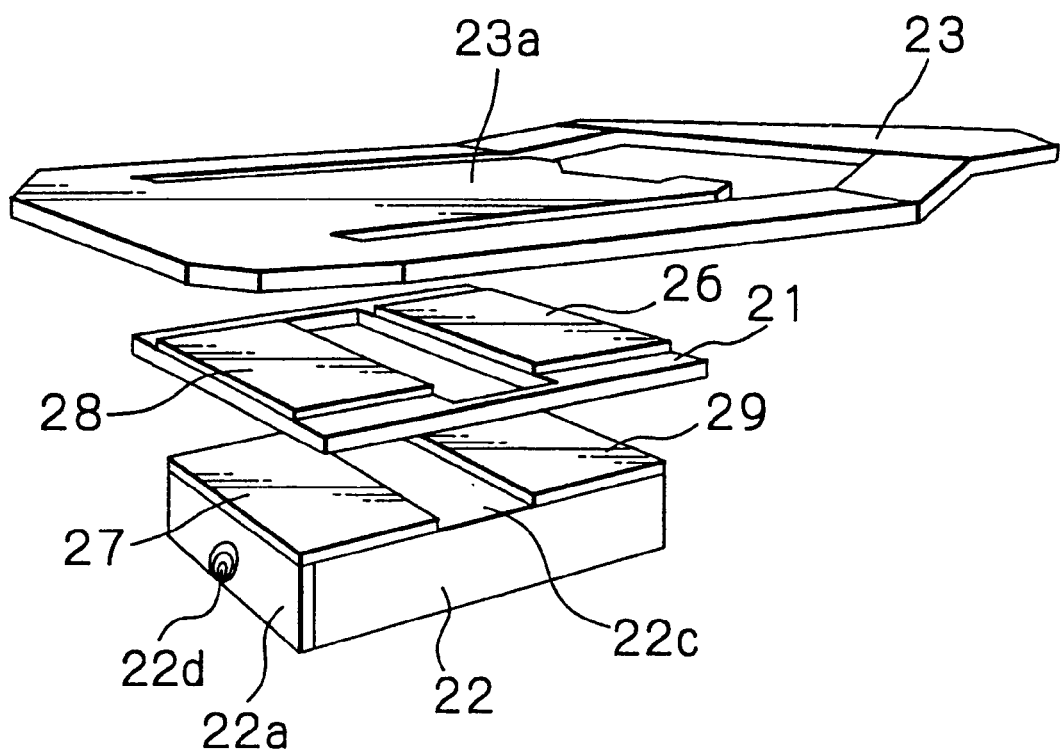
FIG. 12 is an exploded oblique view illustrating an enlarged top end section of an HGA in another embodiment according to the present invention.

FIG. 12 illustrates an enlarged top end section of an HGA in another embodiment according to the present invention.

In this embodiment, a lower surface of the rear end coupling section 21a of the vibration transfer member 21 is fixed to the surface 22c opposite to the ABS 22b of the magnetic head slider 22 by a soft or flexible adhesive that functions as a damping layer 29. As for the flexible adhesive 29, a resin adhesive such as a urethane-rubber base or acryl base pressure-sensitive adhesive for example may be used. Since the slider 22 vibrates in response to the vibration of the top end section of the vibration transfer member 21, both the resonance vibration at the rear end section of the vibration transfer member 21 and the resonance vibration at the top end section of the vibration transfer member 21 that have phases inverted to each other or deviated from each other are applied to this damper layer 29. Thus, they provide resistances with each other and then amplitude of vibrations of the magnetic head slider 22 is attenuated.

Since the damping layer 29 is provided between the rear end coupling section 21a of the vibration transfer member 21 and the magnetic head slider 22, a gap space for inserting an adhesive can be automatically obtained between the vibration transfer member 21 and the slider 22 resulting extremely easy assembling of the vibration transfer member 21 with the magnetic head slider 22.

Other configurations, operations, advantages and modifications in this embodiment are the same as those in the embodiment of FIG. 1. Also, in this embodiment, the similar elements as those in the embodiment of FIG. 1 are represented by the same reference numerals.

Structure of the vibration transfer member is not limited to those of the aforementioned embodiments. Any shaped vibration transfer member provided with a plane shape structure ready for a lateral directional resonance may be utilized.

In the aforementioned embodiments, HGAs having magnetic head sliders with thin-film magnetic head elements are described. However, it is apparent that the present invention can be applied to an HGA with a head element such as an optical head element other than the thin-film magnetic head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vibration-canceling mechanism comprising a vibration transfer means of a plane shape inserted between a vibration-origination system having at least one resonance frequency and an object to which a vibration is applied from said vibration-origination system, said vibration transfer means having a resonance frequency equal to or near said at least one resonance frequency of said vibration-origination system, one end section of said vibration transfer means being fixed to said vibration-origination system and the other end section of said vibration transfer means being fixed to said object so that an apparent vibration of said object is substantially canceled by a resonance of said vibration transfer means.

2. The mechanism as claimed in claim 1, wherein said mechanism further comprises a first damper layer provided between said other end section of said vibration transfer means and said vibration-origination system, for attenuating the vibration of said object.

3. The mechanism as claimed in claim 2, wherein said first damper layer is formed by a flexible resin adhesive adhered to said vibration transfer means and to said vibration-origination system.

4. The mechanism as claimed in claim 2, wherein said mechanism is configured to apply a load in an up-and-down direction to said first damper layer.

5. The mechanism as claimed in claim 1, wherein said mechanism further comprises a second damper layer provided between said one end section of said vibration transfer means and said object, for attenuating the vibration of said object.

6. The mechanism as claimed in claim 5, wherein said second damper layer is formed by a flexible resin adhesive adhered to said vibration transfer means and to said object.

7. The mechanism as claimed in claim 5, wherein said mechanism is configured to apply a load in an up-and-down direction to said second damper layer.

8. The mechanism as claimed in claim 1, wherein said vibration-origination system is a support means including a suspension, and wherein said object is a head slider with at least one head element attached to a top end section of said suspension.

9. The mechanism as claimed in claim 8, wherein said head slider is fixed to one surface of said vibration transfer means and said suspension is fixed to the other surface of said vibration transfer means.

10. The mechanism as claimed in claim 8, wherein said head slider has a surface opposite to its air bearing surface, and wherein said vibration transfer means comprises a plane metal plate substantially in parallel with said surface opposite to said air bearing surface.

11. The mechanism as claimed in claim 8, wherein said vibration transfer means comprises a pair of arm sections, a first coupling section connected between said pair of arm sections at said other end section, and a second coupling section connected between said pair of arm sections at said one end section.

12. The mechanism as claimed in claim 11, wherein each of said arm sections, said first coupling section and said second coupling section has a plane strip shape.

13. The mechanism as claimed in claim 8, wherein said at least one head element is at least one thin-film magnetic head element.

14. A head gimbal assembly comprising a head slider provided with at least one head element, a support means including a suspension and having at least one resonance frequency, and a vibration transfer means of a plane shape inserted between said suspension and said head slider to which a vibration is applied from said support means, said vibration transfer means having a resonance frequency equal to or near said at least one resonance frequency of said support means, a rear end section of said vibration transfer means being fixed to said suspension and a top end section of said vibration transfer means being fixed to said head slider so that an apparent vibration of said head slider is substantially canceled by a resonance of said vibration transfer means.

15. The head gimbal assembly as claimed in claim 14, wherein said head gimbal assembly further comprises a first damper layer provided between said top end section of said vibration transfer means and said suspension, for attenuating the vibration of said head slider.

16. The head gimbal assembly as claimed in claim 15, wherein said first damper layer is formed by a flexible resin adhesive adhered to said vibration transfer means and to said suspension.

17. The head gimbal assembly as claimed in claim 15, wherein said head gimbal assembly is configured to apply a load in an up-and-down direction to said first damper layer.

18. The head gimbal assembly as claimed in claim 14, wherein said head gimbal assembly further comprises a second damper layer provided between said rear end section of said vibration transfer means and said head slider, for attenuating the vibration of said head slider.

19. The head gimbal assembly as claimed in claim 18, wherein said second damper layer is formed by a flexible resin adhesive adhered to said vibration transfer means and to said head slider.

20. The head gimbal assembly as claimed in claim 18, wherein said head gimbal assembly is configured to apply a load in an up-and-down direction to said second damper layer.

21. The head gimbal assembly as claimed in claim 14, wherein said head slider is fixed to one surface of said vibration transfer means and said suspension is fixed to the other surface of said vibration transfer means.

22. The head gimbal assembly as claimed in claim 14, wherein said head slider has a surface opposite to its air bearing surface, and wherein said vibration transfer means comprises a plane metal plate substantially in parallel with said surface opposite to said air bearing surface.

23. The head gimbal assembly as claimed in claim 14, wherein said vibration transfer means comprises a pair of arm sections, a top end coupling section connected between said pair of arm sections at said top end section, and a rear end coupling section connected between said pair of arm sections at said rear end section.

24. The head gimbal assembly as claimed in claim 23, wherein each of said arm sections, said top end coupling section and said rear end coupling section has a plane strip shape.

25. The head gimbal assembly as claimed in claim 14, wherein said at least one head element is at least one thin-film magnetic head element.

* * * * *